United States Patent [19]

Higasa et al.

[11] Patent Number: 5,162,964
[45] Date of Patent: Nov. 10, 1992

[54] CONNECTION CONTROL DEVICE FOR CONTROLLING THE CONNECTION OF SMALL GENERATOR UNIT TO ELECTRIC POWER SYSTEM

[75] Inventors: Hiromasa Higasa; Fumihiko Ishikawa; Shigenori Matsumura, all of Kagawa; Soichi Yamanaka, Kyoto, all of Japan

[73] Assignees: Nissin Electric Co., Ltd., Kyoto; Shikoku Research Institute Incorporated; Shikoku Electric Power Co., Inc., both of Kagawa, all of Japan

[21] Appl. No.: 565,829

[22] Filed: Aug. 13, 1990

[30] Foreign Application Priority Data

Aug. 21, 1989 [JP] Japan .................................. 1-215193

[51] Int. Cl.⁵ .............................................. H02H 7/06
[52] U.S. Cl. ....................................... 361/20; 361/79; 361/21
[58] Field of Search ................... 307/66, 43, 45, 87, 307/64; 322/32; 361/20, 91

[56] References Cited

U.S. PATENT DOCUMENTS 4,752,697 6/1988 Lyons et al. ............................ 290/2
4,851,782 7/1989 Jeerings et al. ...................... 324/520

FOREIGN PATENT DOCUMENTS 0432269 4/1990 European Pat. Off. .
63-237327 10/1988 Japan .
159010 4/1985 United Kingdom .

OTHER PUBLICATIONS

Abstract of Japanese Patent JP-A-63 287 328.
Abstract of Japanese Patent JP-A-63 294 222.
Ranade, Satish J. et al., "A Study of Islanding in Utility-Connected Residential Photovoltaic Systems", IEEE Transactions on Energy Conversion, Sep. 1989, No. 3, pp. 436–445, N.Y.

Primary Examiner—A. D. Pellinen
Assistant Examiner—S. Jackson
Attorney, Agent, or Firm—Finnegan, Henderson, Farabow, Garrett and Dunner

[57] ABSTRACT

A connection control device for controlling the connection of a small generator unit, which is installed at the consumer's location, to an electric power system. The connection control device detects variations in frequency components which result from interruptions in the distribution of electric power to the consumer from the electric power system. When a significant variation in a frequency component is present, the connection control device disconnects the consumer from the electric power system in order to prevent injury to line workers.

15 Claims, 3 Drawing Sheets

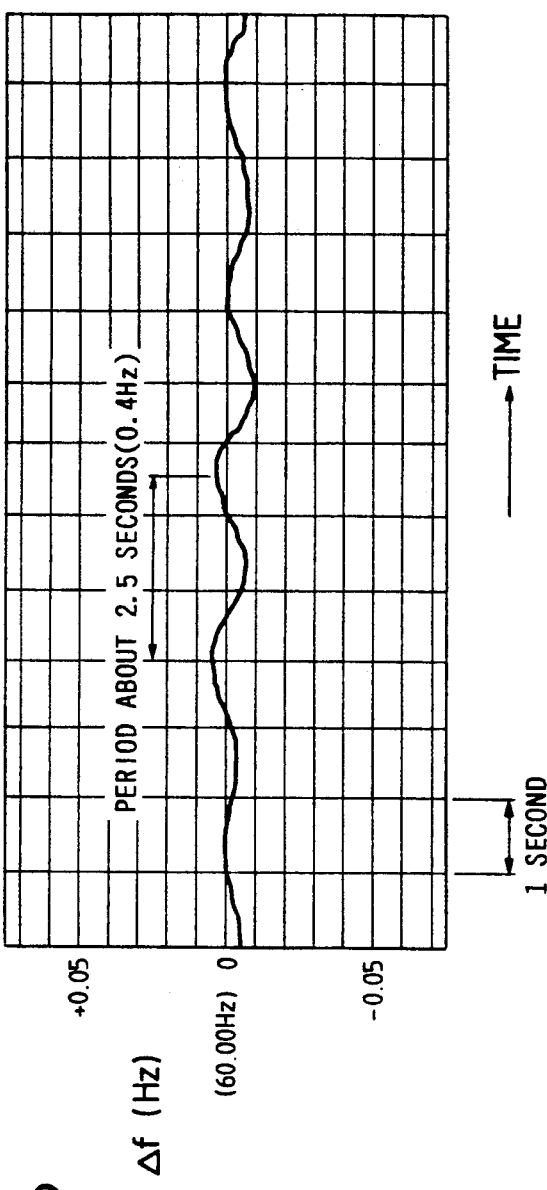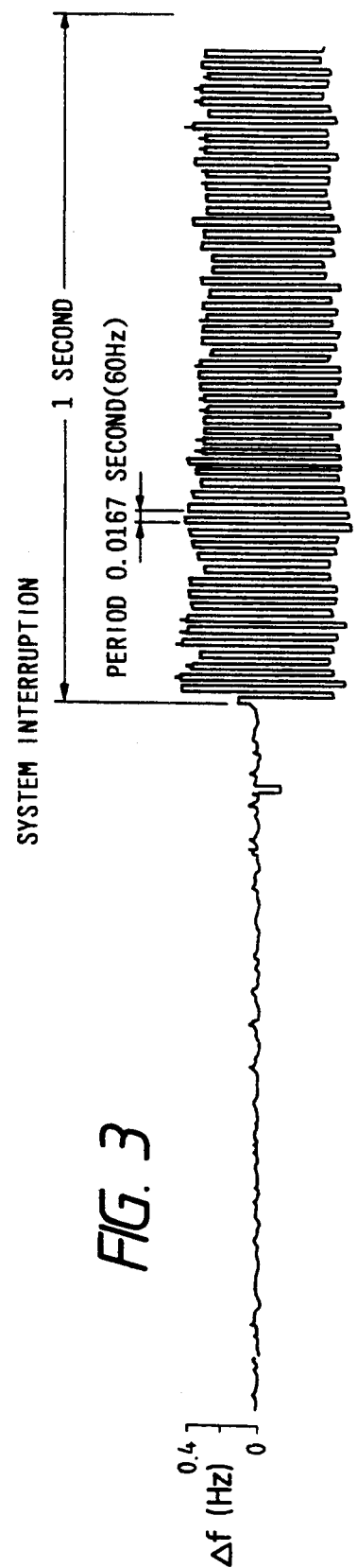

CONNECTION CONTROL DEVICE FOR CONTROLLING THE CONNECTION OF SMALL GENERATOR UNIT TO ELECTRIC POWER SYSTEM

BACKGROUND OF THE INVENTION

1. Field of the Invention

This invention relates to a connection control device for controlling the connection of a small generator unit installed at an electric power consumer to an electric power system.

2. Description of the Related Art

Recently, small generators of the stationary inverter type in which DC power of a solar battery or fuel battery is converted into AC power with an inverter, and small generators of the co-generation type in which an engine and a generator is combined to produce AC power and heat, have been proposed to utilize natural energy and to use energy effectively. The small generator is connected to an electric power system (including a power plant, transmission lines, substations, distribution lines, etc.), so as to utilize the power of the latter when the small generator becomes out of order, or when the electric power generated by the small generator is insufficient to drive the load. That is, the connection of the small generator to the electric power system ensures the stable supply of electric power to the load.

However, the connection of the small generator to the electric power system may cause the following problem: Sometimes installation or repair of an electric power system is carried out with the breaker opened; i.e., with the supply of electric power suspended. If, in this case, a small generator is connected to the electric power system, then the voltage of the small generator is applied to the distribution line (so-called "reverse voltage" is applied to the distribution line), although the electric power system has been interrupted with the breaker opened so as not to supply electric power to the distribution line connected thereto. Because of the reverse voltage, persons engaging in the installation or repair of the distribution line may be electrocuted.

In order to eliminate the difficulty, heretofore the following method is employed: An under- and over-voltage relay (reference voltage±about 15%) and an abnormal frequency relay (reference frequency±about 1 Hz) are provided for the small generator to detect the voltage and frequency provided when the electric power system is interrupted. When the difference between the voltage thus detected and the reference voltage exceeds the tolerance, or when the difference between the frequency thus detected and the reference frequency exceeds the tolerance, the relay determines that the electric power system has been interrupted, and operates to disconnect the small generator from the electric power system.

However, the method is disadvantageous in that, when the electric power outputted by the small generator is in balance with the load to be handled by the electric power consumer, the voltage and frequency change slightly, so that the relays cannot detect the variations, and accordingly the interruption of the electric power system cannot be detected.

In order to eliminate the above-described difficulty, the inventors have proposed the following connection control device in the art (Japanese Patent Application (OPI) No. 237327/1988 (the term "OPI" as used herein means an "unexamined published application"), entitled "Connection Control Device for Controlling the Connection of Dispersed Power Sources to Electric Power System"). The device proposed is based on the fact that it has been found through comparison of the frequency variations (or fluctuations) of the electric power system and the small generator that the frequency variation of the electric power system has a period inherent in the electric power system, whereas the frequency variation of the small generator with an inverter unit is free from that inherent in the electric power system. That is, the frequency variation is monitored at the small generator, and when the frequency variation inherent in the electric power system disappears, it is determined that the supply of electric power of the electric power system has been suspended, and the small generator is disconnected from the electric power system.

The inventors have conducted intensive research on the connection control device, and found that the invention proposed under Japanese Patent Application (OPI) No. 237327/1988 is still disadvantageous in the following point: In the case where the small generator is made up of a stationary generator such as a solar generator and a rotary generator of co-generation type with a diesel engine, a frequency variation may occur which is similar to that inherent in the electric power system, which makes it difficult to determine whether or not the electric power system has been interrupted.

In view of the foregoing, an object of this invention is to provide a connection control device for controlling the connection of a small generator to an electric power system with which, the interruption of the electric power system can be detected even in the case where a small generator such as a rotary generator of co-generation type with a diesel engine is employed.

SUMMARY OF THE INVENTION

The foregoing object of the invention has been achieved by the provision of a connection control device for controlling the connection of a small generator unit to an electric power system, which according to the invention, comprises: switching means for connecting the small generator unit to the electric power system and disconnecting the former from the latter; determining means for detecting a frequency variation(fluctuation)component which is inherent in the small generator unit and appears when the electric power system is interrupted, and determining from the frequency variation component thus detected whether or not the connection of the small generator unit to the electric power system is acceptable; and switching instructing means for outputting a switching instruction signal to the switching means according to a result of determination provided by the determining means.

In the connection control device, the determining means operates to detect the frequency variation component which is inherent in the small generator and appears after the interruption of the electric power system, and it is determined from the presence or absence of the frequency variation component inherent in the small generator whether or not the connection of the small generator to the electric power system is acceptable.

The switching instructing means applies a switching instruction signal to the switching means according to the result of determination done by the determining means.

The switching means operates to electrically connect the small generator to the electric power system or disconnect the former from the latter.

BRIEF DESCRIPTION OF THE DRAWINGS

FIG. 2 is a graphical representation indicating one example of the small variation in frequency of a normal electric power system.

FIG. 3 is a diagram showing one example of the small variation in frequency of an inverter unit in a small generator unit.

DESCRIPTION OF THE PREFERRED EMBODIMENTS

A connection control device for controlling the connection of a small generator unit to an electric power system according to this invention will be described with reference to the accompanying drawings.

Figure 1:
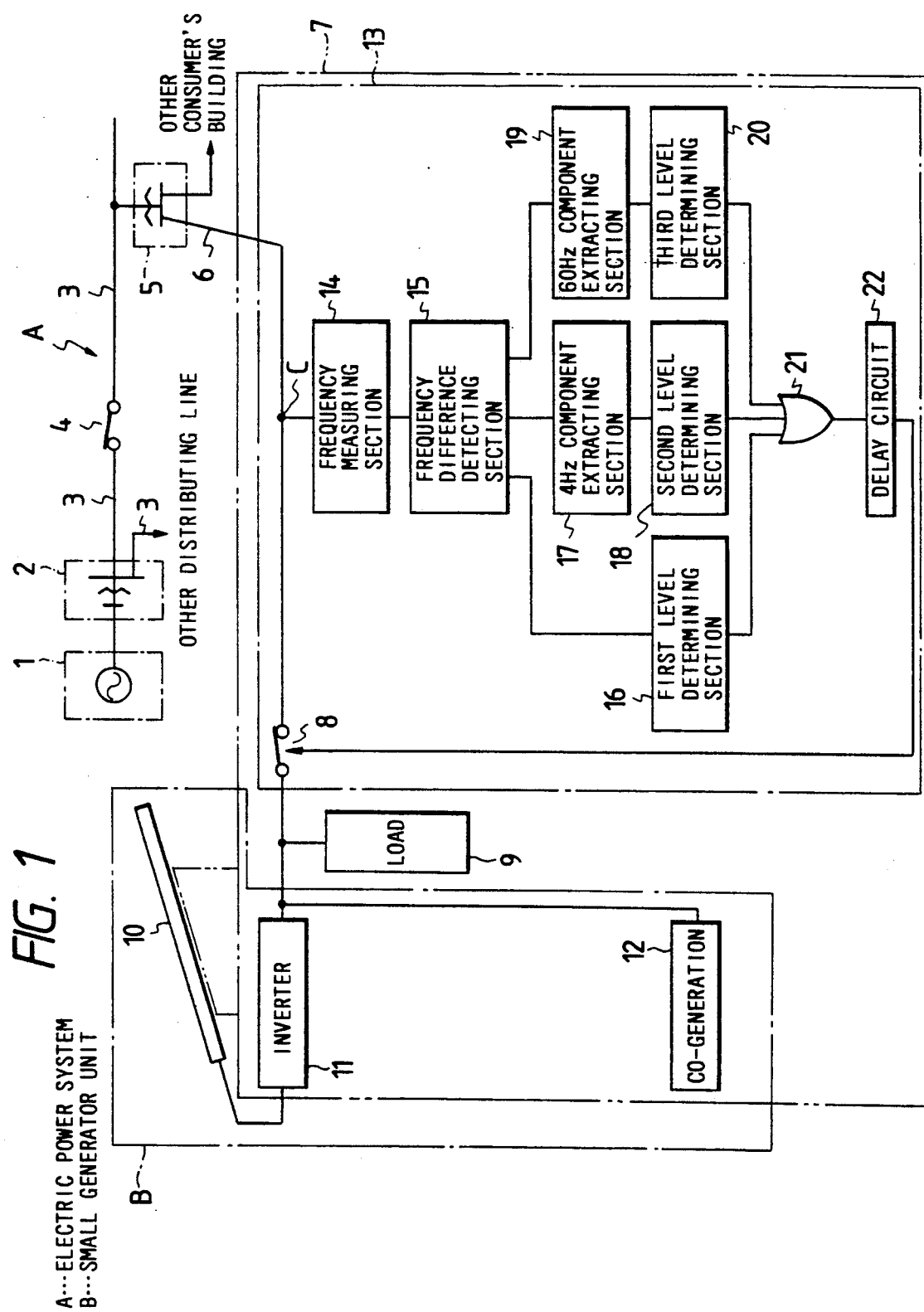
FIG. 1 is an explanatory diagram, partly as a block diagram, for a description of one application of a connection control device for controlling the connection of a small generator unit to an electric power system according to this invention.

FIG. 1 is a block diagram showing the arrangement of the connection control device according to the invention. In FIG. 1, reference character A designates an electric power system which includes a power station 1, a distributing substation 2, distribution lines 3, breakers 4 connected to the distribution lines, a pole-mounted transformer 5, and a lead-in wire 6. The electric power generated by the power station 1 is supplied through the distribution lines 3, as branch powers, to electric power consumers' buildings with the voltage decreased to 6 KV by the power distributing substation 2. The branch powers on the distribution lines 3 are supplied through the breakers 4 to the pole-mounted transformers 5, where the voltage is dropped to 100 V. The branch powers thus voltage-dropped are applied through the lead-in wires 6 to the electric power consumers' buildings 7. The power supplied to each electric power consumer's building 7 through the lead-in wire 6 is applied to a load 9 through a breaker 8 in the connection control device 13.

The electric power system A is interrupted by opening the breaker 4 (hereinafter referred to as "system interruption", when applicable).

In the electric power consumer's building 7, there is installed a small generator unit B in which a stationary generator of inverter type comprising a solar battery 10 and an inverter unit 11 is connected in parallel to a co-generation unit (rotary generator) 12 with a diesel engine. The generator of inverter type and/or the co-generation unit 12 is operated to generate AC power, which is supplied to the load 9 in synchronization with the AC power provided by the electric power system A. Instead of the solar battery 10, a DC power generating means such as a fuel battery may be used.

The connection control device 13 is connected to a point C on the lead-in wire 6. The connection control device 13 comprises: a frequency measuring section 14 for measuring the frequency of a voltage at the point C; a frequency difference detecting section 15 for detecting the difference $\Delta f$ between the frequency thus measured and a reference frequency (for instance 60 Hz) for a predetermined period of time; a first level determining section 16 for comparing the difference $\Delta f$ with a threshold value x (for instance 0.6 Hz, the range of frequency variation which is generally estimated when the electric power system A is normal), and providing a high level signal when $\Delta f > x$; a 4 Hz component extracting section 17 for extracting a 4 Hz component from $\Delta f$; a second level determining section 18 for comparing the 4 Hz component extracted by the 4 Hz component extracting section 17 with a threshold value y (which is set in the range of from the value of the 4 Hz component provided when the electric power system A is normal to the value provided by the small generator unit B when the electric power system A is interrupted); a 60 Hz component extracting section 19 for extracting a 60 Hz component from $\Delta f$; a third level determining section 20 for comparing the 60 Hz component extracted by the 60 Hz component extracting section with a threshold value z (which is set in the range of from the value of the 60 Hz component provided when the electric power system A is normal to the value provided by the small generator unit B when the electric power system A is interrupted); an OR circuit 21 for ORing the outputs for the first, second and third level determining sections 16, 18 and 20; a delay circuit 22; and the aforementioned breaker 8 which is switching means.

The aforementioned value $\Delta f$ will be described in more detail. FIG. 2 is a graphical representation indicating the frequency difference $\Delta f$ of voltage of the normal electric power system A on vertical axis with time on horizontal axis. The value $\Delta f$ varies slightly and periodically around 60 Hz; that is, the period of variation thereof is about 2.5 seconds, or the value $\Delta f$ varies periodically with a frequency of about 0.4 Hz. In addition, it can be observed that, the value $\Delta f$ varies extremely slightly but periodically with a frequency of about 4 Hz. This slight variation in frequency of the electric power system A is due to the fact that the load on the latter changes with time. This will be described in more detail. When the power load is increased, control is so made that the capacity of power generation is increased thereby to maintain the frequency unchanged. However, until this control is started, the energy of rotation of the generator is used as electric energy, so that the speed (frequency) is decreased. When, on the other hand, the power load is decreased, the phenomenon occurs which is opposite to that which has been described above. The period of these phenomena is determined by the mechanical inertia, constants, etc. of the generator, and the period of frequency variation is inherent in the electric power system A.

FIG. 3 is a diagram showing the value $\Delta f$ measured at the point C under the condition that only the stationary generator unit of inverter type forming the small generator unit B is operated and the breaker is opened in the electric power system A.

In this case, the output of the small generator unit B is in balance with the load 9. Therefore, before the system interruption, the variation in average value of $\Delta f$ is substantially zero; however, after the system interruption, the variation is considerably large, and the variation period is of 60 Hz. This phenomenon is inherent in the inverter unit 11. That is, the PLL control given by the inverter unit will not affect the period and power of one cycle, but shifts the zero cross of a half cycle. Hence, the 60 Hz component is varied.

Figure 4:
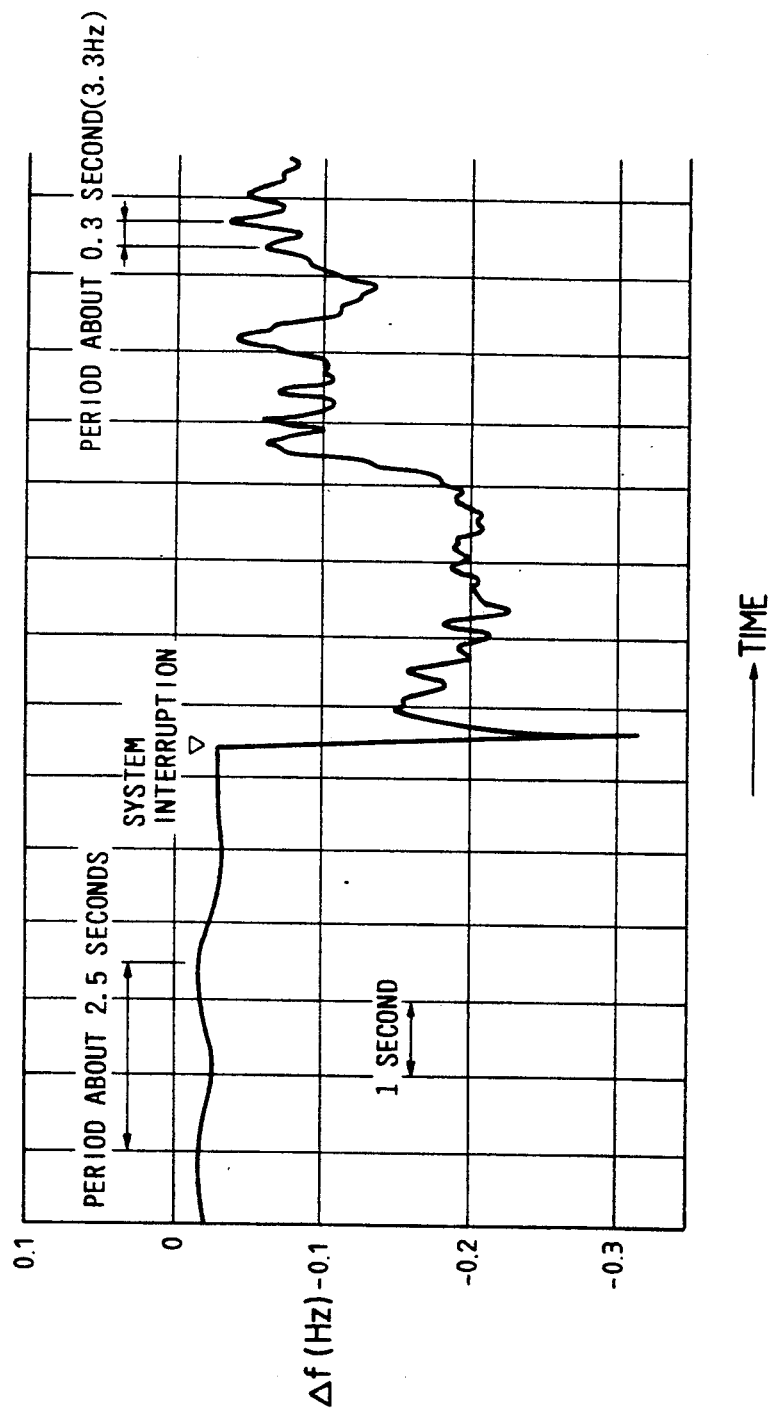
FIG. 4 is a diagram showing one example of the small variation in frequency of a co-generation unit in the small generator unit.

FIG. 4 is a diagram, corresponding to FIG. 3, showing the value $\Delta f$ measured under the condition that only the co-generation unit 12 forming the small generator unit B is operated. Since the output of the small generator unit B is smaller than the load 9, the frequency is decreased after the system interruption; however, the way of variation should be noted. That is, before the system interruption, Δf varies with 0.4 Hz inherent in the normal electric power system A; however, after the system interruption, a periodic variation of less than 4 Hz (hereinafter referred to as "a 4 Hz component", when applicable) appears. As was described above, the value Δf of the electric power system A includes the 4 Hz component. The 4 Hz component of the co-generation unit is larger than that of the electric power system A.

The variation of Δf is different as was described above even though the co-generation unit is a rotary generator similar to those used in a heat power generator or nuclear power generator forming an electric power system. The reason for this difference is that, since the co-generation unit is driven by a reciprocating engine such as a diesel engine, the rotation is not smooth. Thus, the 4 Hz component is inherent in the co-generation unit.

The value Δf has been described with reference to the case where only the stationary generator unit of inverter type is operated and to the case where only the co-generation unit 12 is operated. However, in the case where both the stationary generator unit of inverter type and the co-generation unit 12 are operated, the value Δf at the point C is such that the graphical representations of FIGS. 3 and 4 are placed on each other.

As is apparent from the above description, the Δf component of the electric power system A is clearly different from that of the small generator unit B in the way of appearance. Therefore, it can be determined from extraction of the Δf component whether or not the small generator unit B is connected to the electric power system A which is normal; that is, it can be determined whether or not the connection of the small generator unit B to the electric power system A is acceptable.

The operation of the connection control device for connecting a small generator unit B to an electric power system A will be described with reference to FIGS. 2 through 4.

First, the operation of the connection control device with the small generator unit B connected to the normal electric power system A will be described. The frequency measuring section 14 measures the frequency of the voltage at the point C on the lead-in wire 6 at all times, while the frequency difference detecting section 15 detects the difference Δf-between the frequency thus detected and the reference frequency (for instance 60 Hz). The difference Δf is applied to the first level determining section 16, the 4 Hz component extracting section 17, and the 60 Hz component extracting section 19. In this case, the Δf of the normal electric power system A will not exceed the threshold value x (0.6 Hz in this case), and therefore the first level determining section 16 applies a low level signal to the OR circuit 21.

Upon reception of the value Δf, the 4 Hz component extracting section extracts a 4 Hz component from the value Δf. In the case where the small generator is connected to the normal electric power system A, the 4 Hz component thus extracted is small in variation and its amplitude is substantially as shown in FIG. 2. The 4 Hz component small in variation will not exceed the threshold value y, and therefore the second level determining section 18 applies a low level signal to the OR circuit 21. At the same time, the 60 Hz component extracting section 19, receiving the value Δf, extracts a 60 Hz component from the value Δf. As shown in FIG. 3, the 60 Hz component is small until the system interruption, and will not exceed the threshold value z. Accordingly, the third level determining section 20 applies a low level signal to the OR circuit 21. The above-described low levels signals of the level determining sections 16, 18 and 20 are applied to the OR circuit 21, which accordingly outputs a low level signal. The low level signal thus outputted is applied to the breaker 8. Hence, the breaker 8 is not operated, so that the unit is kept connected to the electric power system A.

When the electric power system A is interrupted; that is, when the breaker 4 is opened to suspend the supply of electric power, the reverse voltage of the stationary generator unit of inverter type and/or the co-generation unit 12 is applied to the lead-in wire 6. The frequency of the reverse voltage is measured by the frequency measuring section 14, while the frequency difference detecting section 15 detects Δf according to the frequency thus measured. The value Δf thus detected is applied to the first level determining section 16, the 4 Hz component extracting section 17 and the 60 Hz component extracting section 19. In the first level determining section 16, the value Δf is compared with the threshold value x. In the case of FIG. 3 or 4, the output of power generation after the system interruption; i.e., the output of the inverter unit 11 or co-generation unit 12 is substantially in balance with the load 9, and therefore the value Δf is not higher than the threshold value x (0.6 Hz). Accordingly, the output of the first level determining section is maintained at low level. In the case where the output of power generation is greatly deviated from the load 9, in FIG. 3 or 4 the value Δf is shifted higher or lower, thus exceeding the threshold value x, as a result of which the output of the first level determining section 16 is raised to high level. The first level determining section is not to detect the component of variation inherent in the small generator unit B; that is, it is provided as a conventional abnormal frequency relay to positively detect when the output of power generation is deviated from the load 9. Thus, it is not always necessary to employ the first level determining section 16.

Upon reception of the value Δf, the 4 Hz component extracting section 17 extracts a 4 Hz component from the value Δf. Similarly, upon reception of the data Δf, the 60 Hz component extracting section 19 extracts a 60 Hz component from the value Δf. In the case where the co-generation unit 12 is connected, the 4 Hz component exceeds the threshold value y, and therefore the output of the second level determining section is raised to high level. In the case where the inverter unit 11 is connected, the 60 Hz component exceeds the threshold value z, and therefore the output of the third level determining unit 10 is raised to high level. Each of the high level signals is applied to the OR circuit 21 as a decision signal indicating that the small generator unit B is connected to an electric power system A which is not in the normal state.

Upon reception of the high level signal from at least one of the three level determining sections 16, 18 and 22, the OR circuit 21 outputs a high level signal, which is applied to the delay circuit 22. That is, in the case where the small generator unit B uses the stationary generator unit of inverter type and the co-generation unit 12 in combination, the frequency variation components inherent in the generators can be detected. Therefore, no matter which of the generators is connected to the lead-in line 6, the high level signal can be obtained at the output terminal of the OR circuit 21.

When the high level signal is applied to the delay circuit 22 continuously for a predetermined period of time (one to ten seconds for instance), then the delay circuit 22 determines that the small generator unit B is not connected to the electric power system A which is not in the normal state, and applies a change-over instruction signal to the breaker 8 to operate the breaker 8, so that the small generator unit B is disconnected from the electric power system A; that is, the application of the reverse voltage to the electric power system A is prevented.

In the case where the small generator unit B is utilizing only the stationary generator unit of inverter type, it can be determined from the 60 Hz component of the value Δf whether or not the small generator unit B is connected to the electric power system A which is in normal condition. Similarly, in the case where the small generator unit B is utilizing only the co-generation unit 12, it can be determined from the 4 Hz component of the value Δf whether or not the small generator unit B is connected to the electric power system A which is in normal condition.

As is apparent from the above-description, with the connection control device according to the invention, the small generator unit switching operation; i.e, the operation of connecting the small generator unit B to the electric power system A and disconnecting the former from the latter can be automatically controlled at the position of the small generator unit B.

The small generator unit switching operation is carried out according to the presence or absence of the component of variation inherent in the small generator unit B. Hence, even when the output of power generation of the small generator unit B is in balance with the load 9, it can be positively determined whether or not the small generator unit B is connected to the electric power system A which is in normal state.

Thus, with the connection control device of the invention, the safety in wiring is enhanced, and electric power can be stably supplied to the electric power consumer with the small generator unit B.

Having described the preferred embodiments of the present invention it will be understood that modifications and variations thereof falling within the spirit and scope of the invention may become apparent to one skilled in the art and that the scope of the invention is to be determined by the appended claims and their equivalents.

What is claimed is:

1. A connection control device for controlling the connection of a small generator unit to an electric power system, comprising:

switching means for connecting said small generator unit to said electric power system and disconnecting the former from the latter;

determining means for detecting at least one frequency fluctuation component which is inherent in said small generator unit and appears when said electric power system is interrupted, and determining from said at least one frequency fluctuation component thus detected whether or not the connection of said small generator unit to said electric power system is acceptable; and switching control means for outputting a switching control signal to said switching means according to a result of determination provided by said determining means.

2. The device of claim 1, wherein said small generator unit comprises a co-generator unit.

3. The device of claim 2, wherein said at least one frequency fluctuation component is inherent in said co-generator unit.

4. The device of claim 3, wherein said at least one frequency fluctuation component inherent to said co-generator unit is a 4 Hz component.

5. The device of claim 2, wherein said co-generator unit is driven with a diesel engine.

6. The device of claim 1, wherein said small generator unit comprises a stationary generator unit of the inverter type.

7. The device of claim 6, wherein said at least one frequency fluctuation component is inherent in said stationary generator unit.

8. The device of claim 7, wherein said at least one frequency fluctuation component inherent to said stationary generator unit is a 60 Hz component.

9. The device of claim 6, wherein said stationary generator unit comprises a solar generator and an inverter unit.

10. The device of claim 1, wherein said small generator unit comprises a co-generator unit and a stationary generator unit of the inverter type.

11. The device of claim 10, wherein said at least one frequency fluctuation component comprises frequency fluctuation components inherent in said co-generator unit and said stationary generator unit.

12. The device of claim 11, wherein said at least one frequency fluctuation component inherent to said co-generator unit is a 4 Hz component.

13. The device of claim 11, wherein said at least one frequency fluctuation component inherent to said stationary generator unit is a 60 Hz component.

14. The device of claim 1, wherein the connection of said small generator unit to said electric power system is acceptable so long as said at least one frequency fluctuation component does not exceed a threshold level.

15. The device of claim 1, wherein said switching control means comprises a delay circuit.

* * * * *